United States Patent [19]

Salger

[11] 3,964,429

[45] June 22, 1976

[54] DEVELOPER REPLENISHMENT DEVICE FOR COPYING MACHINES

[75] Inventor: Werner Salger, Hamburg-Langenhorn, Germany

[73] Assignee: Lumoprint Zindler KG, Hamburg, Germany

[22] Filed: Sept. 9, 1975

[21] Appl. No.: 611,809

[30] Foreign Application Priority Data

Sept. 12, 1974 Germany ........................ 2443653

[52] U.S. Cl. .............................. 118/7; 118/637; 74/149; 222/414

[51] Int. Cl.$^2$ .................... B05C 11/00; F16D 4/12

[58] Field of Search .......... 222/414, 287, 406, 407; 74/128, 148, 149, 150, 151, 153, 154, 160, 167; 118/7, 637

[56] References Cited

UNITED STATES PATENTS 3,059,488 10/1962 Daubenberger .................... 74/152

3,872,837 3/1975 Rogers ............................ 222/407

*Primary Examiner*—Allen N. Knowles
*Assistant Examiner*—Hadd Lane
*Attorney, Agent, or Firm*—Toren, McGeady and Stanger

[57] ABSTRACT

A device for replenishing the developer material in a copying machine comprises a supply reservoir with a roller, preferably having a flocculent surface, acting as a bottom closure therefor, the roller being driven from a shaft associated with developer conveyor means of the developing unit. Each movement step of the roller is a consequence of a revolution of the shaft. A ratchet and pawl mechanism, preferably controlled by a solenoid, links the shaft and roller. The device may also include adjustable timing means which ensures that a preset developer replenishment is always effected even if the copying machine stops.

13 Claims, 5 Drawing Figures

DEVELOPER REPLENISHMENT DEVICE FOR COPYING MACHINES

FIELD OF THE INVENTION

This invention relates to a device for replenishing the developer material in a copying machine, and more particularly for replenishment of the supply of toner to a developing unit of an electrophotographic copying machine, the device comprising a supply reservoir with a roller rotatably mounted at a bottom opening of the reservoir to act as a closure member therefor, the roller being arranged to be driven according to the amount of toner replenishment which is required, and the developing unit having associated therewith drive means including a shaft arranged to drive for example a bucket conveyor.

The invention is not limited to electrophotographic copying machines, although these represent a preferred type of machine with which the invention can be used. The invention is applicable also to other developing units in which an active substance is used up during the course of the development process and which must be replenished in dependence upon the number of copies made.

Both liquid and dry developers are known for use in electrophotographic copying machines. The present invention is applicable to both types of developer, in the case of a liquid developer this consisting of a suspension of the toner in a liquid, the toner being replenished according to the measure of its utilisation within the developing process.

However, the invention is more preferably applied to a so-called dry developer comprising a developing powder which is scattered onto a sensitisable transfer surface, preferably of a drum, and adheres to the surface in accordance with the configuration of a latent electrostatic image in order that the adhering particles can then be transferred to a copy sheet.

BACKGROUND OF THE INVENTION

Developer material mixtures are known which consist of both toner particles and carrier particles. The toner particles are carried by the carrier particles to which they adhere due to electrostatic attraction forces. Upon being stewn upon an illuminated transfer surface the toner particles are picked up from a photoconductive layer of the transfer surface in order to develop the image. The toner particles are used up by this means and it becomes necessary to replenish them. Such replenishment is known and can be effected either by hand or automatically. The utilisation of the toner depends upon the number of copies to be developed, upon the particular size of the image surface, and upon the required blackness of the image. It is also known to monitor the originals being copied by optical means and to control the replenishment of the developer in dependence thereon.

One method, for example as described in German Patent Specification No. 1772295, uses a metering valve. In this known arrangement the metering valve is actuated in dependence upon the number of copies produced, and indeed according to a manual setting the valve is operated upon a predetermined cycle count in relation to the copy count.

It is also known from German published patent application No. 2141677 to provide a roller in the bottom opening of a supply reservoir, the roller being driven by drive means. This roller defines solely the opening formed in conformity therewith and throws toner into a developer supply reservoir positioned immediately beyond the edge of the opening towards which the roller advances in its direction of rotation. This results in a considerable spraying of the toner which in general adversely affects a thorough mixing of it.

This roller drive means, in one arrangement, comprises a manually adjustable electric current source which powers a driving motor for the roller, possibly intermittently at a constant speed of rotation.

The roller forming the closure member for the opening may have a profiled surface.

The drive, particularly the intermittent drive of the roller forming the closure member, is rendered problematical on account of the considerable contamination which is unavoidable in the neighbourhood of a powder scattering device. If a drive motor is used, it is also necessary to incorporate constructionally expensive coupling devices. Such coupling devices are impracticable however when there is more than a certain degree of contamination present. The same applies also for expensive engagement or meshing elements necessary for the creation of driving engagement between the parts.

SUMMARY OF THE INVENTION

It is an object of the present invention to provide a replenishment device of the type first mentioned above, which is improved in that robust drive means are provided for the roller, the drive means being controllable cyclically by simple means even under unfavourable conditions, and in which furthermore it is possible to arrange for a particularly good metering of toner in relation to the operation of the developing unit.

This is achieved in accordance with the present invention by a device for replenishing the developer material in a copying machine, particularly for replenishment of the supply of toner to a developing unit of an electrophotographic copying machine, the device comprising a supply reservoir, roller means rotatably mounted at a bottom opening of the reservoir to form a closure for the reservoir, said roller means being arranged to be driven in accordance with the required toner replenishment, drive means comprising a rotatable shaft associated with developer conveyor means of the developing unit, said roller means being driven in dependence upon the rotation of said shaft, and each movement step of the roller means being a consequence of a revolution of said shaft.

Thus, the replenishment is effected in every case in a predetermined proportion to the operation of the developing unit, but even so control of the setting for the replenishment of the developer material, i.e. the toner supply, is provided for.

According to one particularly preferred embodiment of the invention the shaft drives a pawl lever in a reciprocating manner, and on the roller is provided a ratchet wheel having teeth for engagement with the pawl, a yieldable lifting device being arranged to cooperate with the pawl to raise the pawl into engagement with the ratchet wheel. This simple ratchet engagement works effectively even when there is a certain degree of contamination present. The engagement is accurately defined under all conditions, and in particular one avoids the problem of certain known arrangements that the driving action is dependent upon a frictional engagement.

It is also envisaged as being within the scope of the invention that a crank rod type drive of the pawl lever from the shaft is possible. This crank rod type drive would have the advantage that not only would one achieve the reciprocating movement but also a pivotal movement of the pawl to and fro. A spring may be used as the yieldable lifting device, the spring preferably being mounted in relation to a seating surface at a position such that the aforesaid pivotal movement of the pawl takes place and that an engagement of the ratchet and pawl occurs only on the stroke of the pawl which takes place in the direction of rotation of the ratchet wheel. There is also the possibility that bearing supports for the lifting device or for the spring or an extension thereof may be varied automatically in order to achieve control dependent upon numbers of working cycles.

According to another preferred feature of the invention a pivot bearing for the pawl lever is provided on the shaft eccentrically in relation to the axis of the shaft. This results in a simple and space saving arrangement with particularly good guidance of the pawl.

It has been found to be particularly effective if a solenoid is used as the lifting device, with the iron core of the solenoid being secured to the pawl, and with a support fork being positioned beneath the pawl to limit its downward movement. The support fork thus forms a guide member beneath the pawl and also serves as a pivot bearing for the cranked or eccentric rotation. The solenoid is controllable for a yielding engagement of the pawl with the ratchet teeth without any mechanical means having to be provided therefor. The solenoid has the further advantage that control in accordance with the working cycles can be accomplished in a particularly simple manner.

Preferably, the pawl lever is arranged to be brought into engagement with the ratchet wheel from below, and the ratchet teeth of the wheel are undercut, whereby the undercutting of the teeth supportingly holds the pawl, which has been brought into engagement therewith, during its movement stroke in the driving direction until it disengages from the ratchet wheel. By means of this mechanical supporting engagement the attraction force of the solenoid is substantially relieved from maintaining the engagement so that a comparatively sensitive and efficient control is possible.

The engagement of the pawl lever with the underside of the ratchet wheel has, also the advantage that any dirt or contamination on the ratchet wheel in the region of engagement will fall away automatically. For the rest, the sequential ratchet engagement of the ratchet teeth and pawl also leads to self-cleaning due to the mutual frictional engagement of the two parts.

It is preferable for the ratchet wheel and the shaft to rotate in opposite senses, with the ratchet wheel drive being effective over the upper arcuate region of the shaft. This is particularly favourable since upon the rotation of the shaft an approach of the pawl towards the ratchet wheel occurs automatically, and in the particular preferred arrangement there occurs a pivotable movement of the pawl during the movement stroke such that first one achieves a smooth engagement of the parts, and then the pawl is held securely in the undercut ratchet wheel teeth right up to the end of the movement stroke.

Preferably, a timing device is provided between the solenoid and a rotating part of the copying machine equipped with a cam switch. The timing device effects the energisation of the solenoid for a minimum time which corresponds at least to one half revolution of the shaft. In this way one only needs to use one switching pulse to energise the solenoid and such a switching pulse can easily be generated in dependence upon the feeding of a copy sheet into the machine.

The timing device is preferably adjustable, and the length of time that the solenoid is energised is preferably such that one stepwise movement of the ratchet wheel occurs for every two or more rotations of the shaft. It will be appreciated that the timing device thus makes it possible to effect control in dependence upon the working cycle.

A separate drive motor is preferably provided for the developing unit. This drive motor is preferably arranged next to a main drive motor used to drive the continuously rotating parts and feeding means of the copying machine after the machine is switched on. Preferably, this separate drive motor is arranged to be switched on in dependence upon the passage of a copy sheet through the machine, although the switch for this separate drive motor can be overridden by the timing device. This has the effect, in relation to the passage of the copy sheet, of triggering a running-on of the drive motor until the timing device control has expired. In this way one ensures that toner replenishment, when once selected, is carried out.

With this in mind it is preferable that the timing device should store any already set remaining time even after the drive for the developing unit is stationary, and should run on after the developing unit is switched on again. This avoids the need for expensive storage devices which need to include summation circuits, possible in combination with special counting means.

Preferably, a controller of the timing device is provided which is controllable in dependence upon an optical monitoring of the original to be copied, i.e. the toner replenishment is effected in dependence upon the amount extracted by the particular developing process.

BRIEF DESCRIPTION OF THE DRAWINGS

A preferred embodiment of device in accordance with the invention will now be described by way of example and with reference to the accompanying drawings, in which.

DESCRIPTION OF THE PREFERRED EMBODIMENT

In the following description elements common to the several views are indicated respectively by the same reference numbers.

Figure 5:
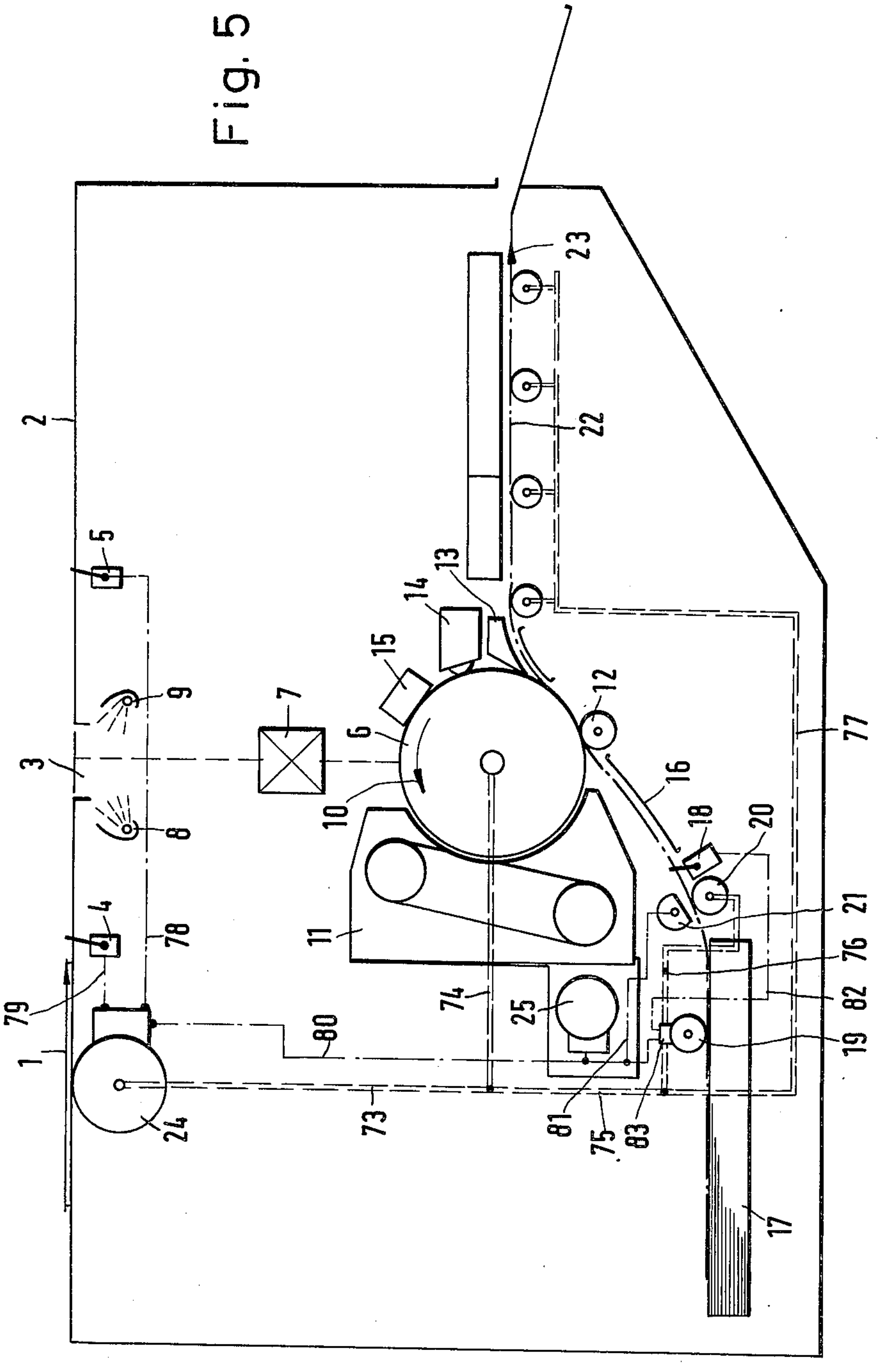

Referring first to FIG. 5, this shows an electrophotographic copying machine in which an original to be copied is guided in the direction of the arrow 1 over the upper surface 2 of the copying machine, so that it passes over a scanning slot or aperture 3. Trip switches 4 and 5 for control purposes are provided in the path of the original both in advance of and subsequent to the scanning aperture 3. The arrow 1 which is shown illustrating the path of the original to be copied represents various different possibilities for guidance of the original. The original arranged to move in accordance with the arrow 1 may for example be carried on a carriage having a transparent contact surface and guided on rails on the upper surface 2 of the machine. A drive motor 24 which will be referred to again later can then drive the carriage back and forth in a reciprocating manner over the scanning aperture, for example by means of gearing or a toothed rack. A rotary reversible coupling of known form may be provided between the motor 24 and the gearing or toothed rack in order to be able to control in the one sense the forward movement of the carriage and in the other sense the reverse movement of the carriage.

An alternative for guidance of the original is for pairs of guide rollers to be arranged in the region of the scanning aperture 3 both in advance of and following the scanning aperture 3, one roller of each pair being driven and guiding a sheet-form original according to the arrow 1 in one direction over the scanning aperture.

A drum 6 with a photoconductive surface layer is rotatably mounted beneath the scanning aperture 3. Between this drum 6 and the scanning aperture 3 there is provided an optical system 7 with which scanning light sources 8 and 9 are associated. Around the periphery of the drum 6 are arranged a number of operational stations or units. These comprise, following arrow 10 and taking them in order in an anti-clockwise sense starting with the exposure station at the top of the drum, a developing unit 11, a transfer station 12, a removal device 13 for the copy sheets, a drum cleaning device 14, and an electrostatic charging device 15 which is positioned immediately before the exposure station. The copy sheets are fed to the transfer station 12 by way of a guide plate member 16 from a stacked supply of copy sheets 17. Thus, a "ready" position can be established which is determined by a trip switch 18. A sheet withdrawal roller 19 rests on the upper surface of the stack 17 and in front of the stack there is provided a pair of drive rollers consisting of a continuously rotating roller 20 and a roller 21 which includes a flat peripheral zone and whose rotation is controlled in dependence upon the feeding of an original to the scanning aperture 3, for example by means of the switch 4, in order to feed a copy sheet located in the ready position to the transfer station 12. Such an arrangement is described for example in German Patent Application No. P 15 61, 157.1–27.

The copy sheet withdrawal roller 19 feeds a copy sheet into the ready position at the switch 18 which, when tripped by the sheet, causes the withdrawal roller 19 to cease rotation. The switch 4, and possibly also the switch 5, controls the drive of the intermittently driven roller 21 according to the supply of an original to be copied, so that a copy sheet comes from the ready position in front of the switch 18 to the transfer station 12 in synchronism with the developed latent image on the drum 6 coming to the transfer station. Following the transfer station 12 the copy sheet is passed through a drying or fusing zone 22 by driven rollers and is subsequently ejected from the machine as indicated by the arrow 23. The main drive motor 24 which serves for the transportation of the original in the direction of the arrow 1, for the driving of the drum 6, and for the driving of the copy sheet roller 20 and of the drying zone rollers 22, as well as further elements, can be controlled by a main switch. The copy sheet withdrawal roller 19 is connected through a separate coupling 83 which is controlled by the trip switch 18. In FIG. 5 the drive connections from the main motor 24 to the various driven elements are indicated at 73, 74, 75, 76 and 77, and further connections 78, 79, 80, 81 and 82 for control purposes are also indicated.

Copying machines as described above are known in which the developing unit is designed in the manner referred to above as a "separate" unit.

The developing unit 11 has a separate drive motor 25 which is controlled by the trip switches 4 and 5 in dependence upon the passage of an original over the scanning aperture 3.

Figure 1:
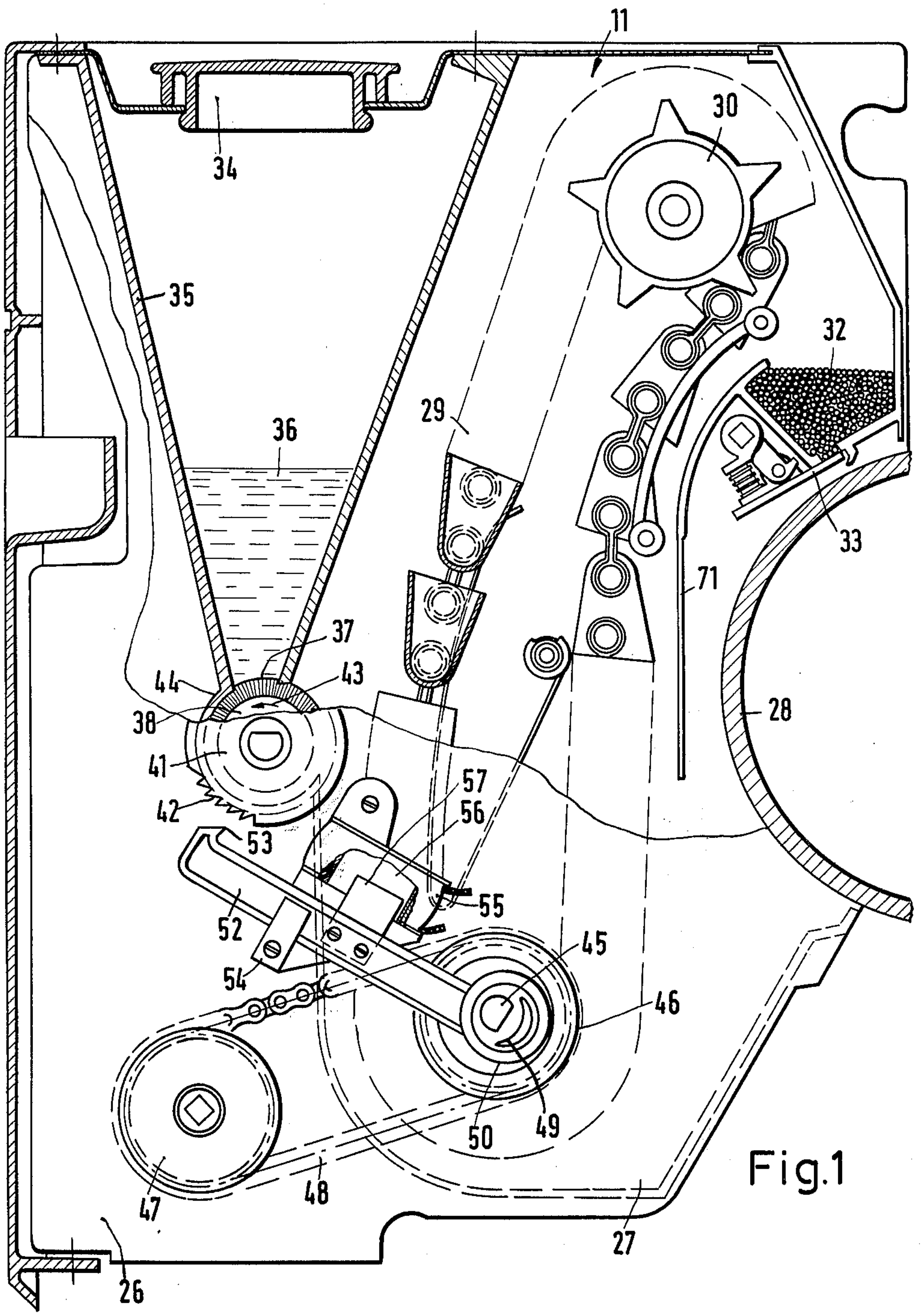
FIG. 1 is a partial sectional side view of a developing unit including the replenishment device of the present invention.
Figure 2:
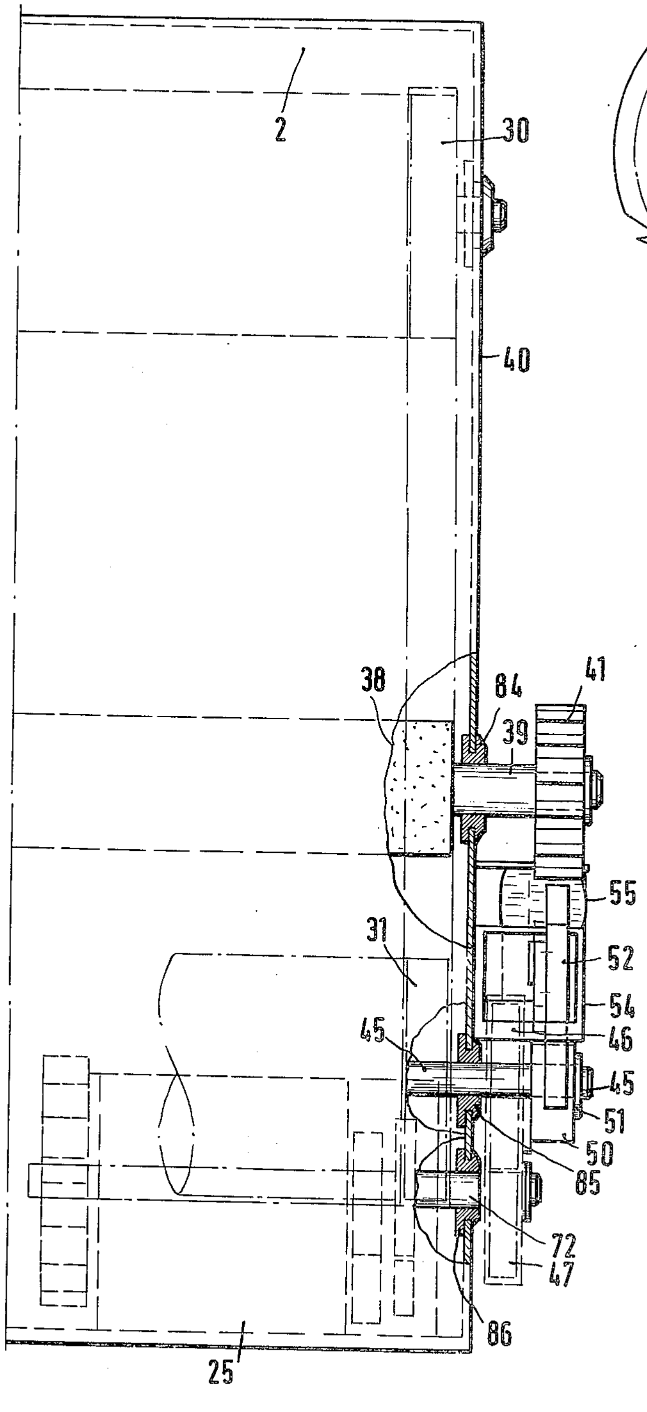
FIG. 2 is an end view of the developing unit as viewed from the left-hand side of FIG. 1, and partly in section.

FIGS. 1 and 2 show the developing unit 11 on an enlarged scale. Within a housing indicated generally at 26 there is provided a developer reservoir 27 having side walls each provided with a substantially semi-circular recess. The drum 6 rotates within this recessed zone and seals are provided at the marginal edges. A portion of the drum surface is indicated at 28 in FIG. 1. Within this reservoir 27 there is an accumulation of the developer material. A bucket conveyor 29 which is guided around sprocket wheels 30 and 31 carries quantities of developer powder from the accumulation of developer powder in the reservoir to a delivery hopper 32 having a bottom closure plate 33 which is controllable in a special way and which is positioned above the rotating surface of the drum 6. In this connection reference is made to German patent application No. P 24 17 188.8.

Within the housing 26 is arranged a supply hopper 35 which is accessible from the top through a closable aperture 34 and in which a supply of the toner 36, i.e. the developer material, is held. The lower open end 37 of the hopper 35 is closed by a rotatably mounted flocculent withdrawal roller 38.

Figure 3:
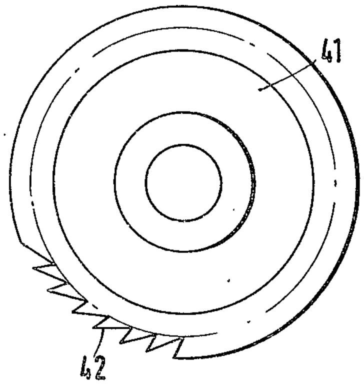
FIG. 3 is a view, on an enlarged scale, of the ratchet wheel of the replenishment device.

As can be seen best from FIG. 2, the toner withdrawal roller 38 is mounted on a shaft 39 which is mounted in side walls of the housing 26, one of which side walls is indicated at 40 in FIG. 2. A bearing for the shaft 39 is indicated at 84. Likewise, two further support shafts 45 and 72, which will be referred to later, are mounted in respective bearings 85 and 86. The shaft 39 which projects from the toner withdrawal roller 38 carries at its end a ratchet wheel 41 having ratchet teeth 42 which, as can be seen particularly well in FIG. 3, are undercut. The steeper, i.e. undercut, flank is the one on the near side of each tooth when moving around the wheel in an anti-clockwise sense, so that on engagement with a pawl there is a driving movement in the anti-clockwise sense in the direction of the arrow 43 shown in FIG. 1. Following the hopper aperture 37 in the direction of rotation of the roller 38 the roller is guided by a curved guide surface 44 which conforms to the shape of the roller over a substantial peripheral section thereof and which terminates at an edge of the developer reservoir 27 above the accumulated developer therein. By this arrangement one avoids a turbulent discharge of the toner carried on the roller 38 as the particles are released from the roller, and one also achieves a particularly advantageous quantitative metering of the toner since the toner particles are pressed into the flocculent surface of the roller. The flocculent surface structure of the roller has a certain inherent resilience which tends to yield the toner particles carried on the roller when freed from the guide surface 44, but without the particles being sprayed out.

The shaft 45 for the lower sprocket wheel 31 of the bucket conveyor extends outwardly through the side wall 40, in which it is mounted, and carries a chain wheel 46 at its end. A further chain wheel 47 is associated therewith. The two chain wheels 46 and 47 are connected with one another by a drive chain 48. The shaft 72 which carries the chain wheel 47, and which is likewise mounted in the side wall 40, is coupled to the separate drive motor 25 below the guide surface 44.

Outwardly of the chain wheel 46 there is positioned a cylindrical eccentric 49 which is mounted eccentrically relative to the shaft 45. A toothed lever 52 constituting a pawl is pivotally mounted on this eccentric 49, for example by means of a ring 50 which is secured in place by a washer 51. The pawl 52 has a latch tooth 53 at its free end for engagement with the ratchet teeth 42 on the wheel 41. The pawl 52 which is movably guided beneath the ratchet wheel 41 is supported in a forked bracket 54.

A solenoid 55 is secured to the side wall 40 of the housing above the pawl 52 and abov its support fork 54. This solenoid 55 has a slot-type core aperture 56 for a magnetic core 57 which is rigidly secured to the pawl 52. The core 57 is designed to be shorter than the core aperture 56 in the direction of movement of the pawl 52. Upon rotation of the eccentric 49 the pawl 52 is moved in a reciprocating manner essentially along the line of its major axis and also pivots on the support fork 54 to a degree dependent upon the amount of eccentricity of the eccentric 40 relative to the shaft 45. By this movement and on the forward stroke the pawl tooth 53 moves up close to the ratchet teeth 42 but not however into engagement therewith. The pawl tooth 53 only comes into engagement with the ratchet teeth 42 when the solenoid 55 is energised and the iron core 57 is drawn into the solenoid. On the reverse stroke of the pawl 52, when the eccentric 49 moves around the upper arc of the chain wheel 46 as it is shown in FIG. 1, the ratchet wheel 41 is entrained by the pawl tooth 53, the engagement being maintained automatically especially by the undercut configuration of the teeth 42, until the reverse stroke reaches its end. Only if the solenoid is maintained in the energised state does further rotation of the eccentric cause the pawl tooth 53 to be displaced yieldingly into contact with the teeth 42 in order to accomplish for a subsequent reverse stroke of the pawl a further engagement with the ratchet teeth and stepped rotation of the wheel 41. The latch 53 thus executes an arcuate movement. The ratchet wheel 41 may be provided for example with forty teeth so that the roller 38 rotates through one complete revolution for every 40 revolutions of the chain wheel 46. In this way one can accomplish a very finely graduated replenishment of the toner.

From the description given above it will be clear that a robust drive system is thereby provided.

Figure 4:
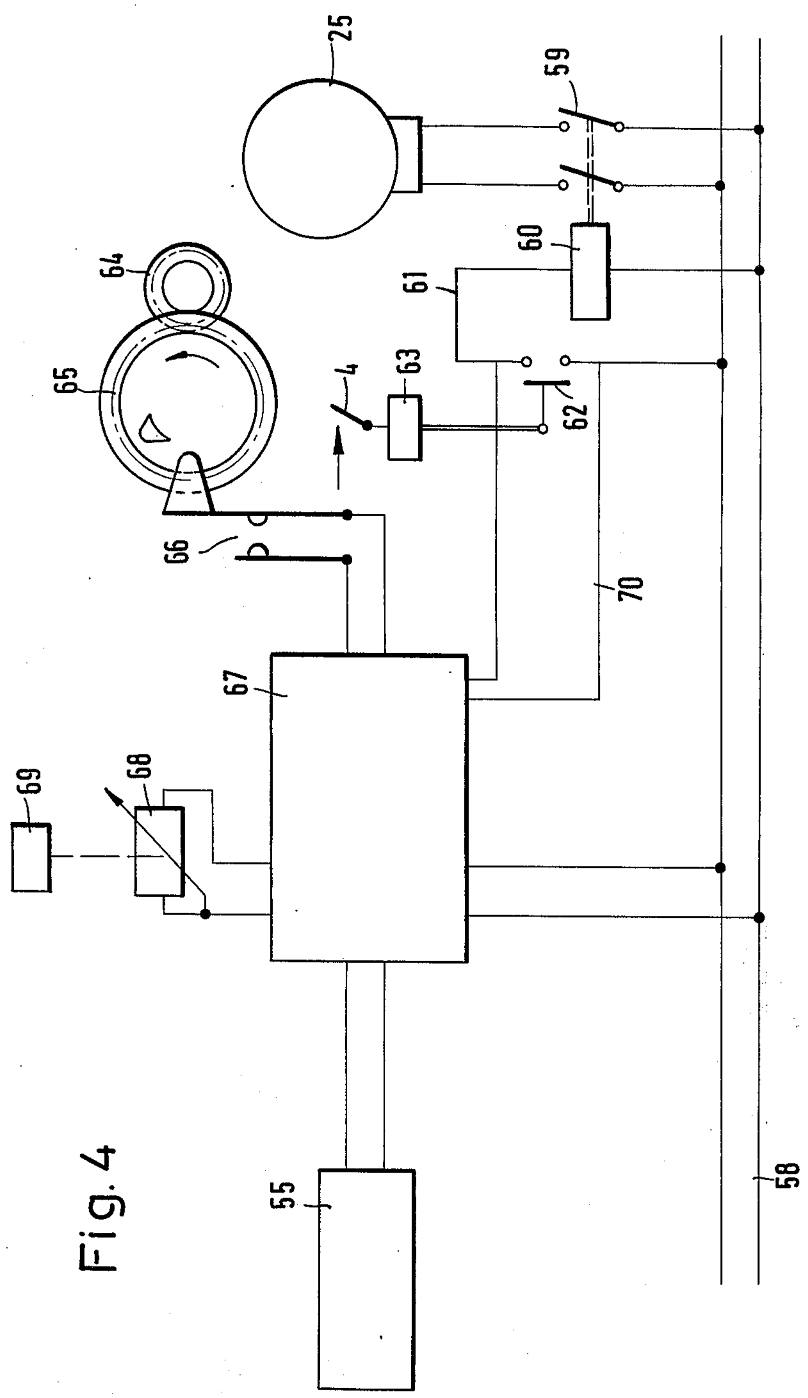
FIG. 4 is a schematic diagram to illustrate the control of the developing unit; and, FIG. 5 is a schematic representation of an electrophotographic copying machine in which the replenishment device of the present invention can be used.

In FIG. 4 those elements corresponding to elements referred to above in other Figures are indicated by the same reference numbers respectively. The motor 25 for the developing unit is connected to electrical supply leads 58 through a switch 59 which is controlled by an actuating magnet 60. A switch 62 which is closed by actuation of the trip switch 4 is connected into the energisation circuit 61 of the actuating magnet 60. A time control device 63 is connected between the trip switch 4 and the switch 62 and is so set up that the switch 62 remains closed for so long as a copy sheet is passing through the machine.

A gear-wheel 64, shown in FIG. 5, is arranged on the flat-zone roller 21 which effects one revolution upon the feeding in of a copy sheet, the gear-wheel 64 meshing with a toothed cam wheel 65 with a transmission ratio of 1:5. This cam wheel 65 actuates a switch 66 which then triggers a timing unit 67 which has an output to the solenoid 55. With such an arrangement the switch 66 sends a pulse upon the feeding in of every fifth copy sheet. This means that the solenoid 55 is energised at least on the feeding in of every fifth copy sheet and each time this occurs the toner withdrawal roller 38 executes a movement step.

The timing unit 67 is provided with a controller 68 by means of which, following a single triggering of the timing unit 67, the length of time that the solenoid 55 is energised can be increased for example to 6 seconds. Following on from the fact that the minimum time energisation of the timing unit 67 brings about one working cycle step of the roller 38 there is thus created the possibility of controlling up to six or more working cycle steps of the roller 38 by a triggering of the timing unit 67.

The controller 68 can be controlled by an optical monitoring device 69 viewing the originals to be copied.

It will be apparent that the motor 25 is energised only in dependence upon the passage of a copy sheet through the machine. The switch 62 however can be by-passed by the provision of a connection 70 from the timing unit 67. If for example six movement steps of the roller 38 are set for the last copy on the basis of a manual setting or by sending of the original then the timing unit 67 by means of the connection 70 ensures that the motor 25 continues to run until the preset toner replenishment has been carried out. Any excess developer fed into the hopper 32 is designed to fall back into the reservoir 27 by falling over a guide plate 71.

Preferably, the timing unit 67 stores a time setting when once fed into the unit by way of the controller 68, so that after stopping of the machine and the subsequent feeding in of a copy sheet, even if then because of the transmission at 64 and 65 no pulse is fed to the timing unit 67, the solenoid 55 will still first of all be energised until the time period already set by the controller 68 has elapsed.

I claim:

1. A device for replenishing the developer material in a copying machine, particularly for replenishment of the supply of toner to a developing unit of an electrophotographic copying machine, the device comprising a supply reservoir having a bottom opening, roller means rotatably mounted at the bottom opening of the reservoir to form a closure for the reservoir, said roller means being arranged to be driven in accordance with the required toner replenishment, first drive means comprising a rotatable shaft associated with the developing unit, conveyor means for developer material arranged to be driven from said shaft, and second drive means to drive said roller means in dependence upon the rotation of said shaft, each movement step of the roller means being a consequence of a revolution of said shaft, said second drive means comprising a toothed pawl arranged to be driven in reciprocating manner from the shaft, an associated ratchet wheel connected to said roller means and provided with a toothed peripheral portion for engagement with the pawl, and yieldable lifting means arranged to cooperate with the pawl to lift it into engagement with the ratchet wheel.

2. A device as claimed in claim 1, which includes a crank rod drive for the pawl between the pawl and the shaft.

3. A device as claimed in claim 1, which includes a pivot bearing for the pawl mounted on the shaft eccentrically relative to the axis of the shaft.

4. A device as claimed in claim 1, in which said lifting means comprises a solenoid having a core secured to the pawl, and with support means positioned beneath the pawl to limit movement thereof away from the solenoid.

5. A device as claimed in claim 4, in which the solenoid includes an aperture for the core, said aperture being longer than the corresponding core dimension in the direction of movement of the pawl in accordance with the degree of eccentricity in the drive between the shaft and the pawl.

6. A device as claimed in claim 4, which includes a timing device between the solenoid and a rotating part of the machine equipped with a cam switch, said timing device being arranged to effect energisation of the solenoid for a minimum time corresponding at least to one half revolution of the shaft.

7. A device as claimed in claim 6, in which the timing device is adjustable, and the period of energisation of the solenoid is so determined that one stepwise movement of the ratchet wheel occurs for every two or more revolutions of the shaft.

8. A device as claimed in claim 6, which includes a separate drive motor for the developing unit, said separate drive motor being arranged to be energised in dependence upon the passage of a copy sheet through the machine, and wherein a switch is provided for this separate drive motor which can be overridden by the timing device.

9. A device as claimed in claim 8, in which the timing device stores any preset remaining time even after the drive motor for the developing unit is brought to a standstill, and runs on when the developing unit is next switched on.

10. A device as claimed in claim 6, which includes a control means for the timing device which is controllable in dependence upon optical monitoring of the originals to be copied.

11. A device as claimed in claim 1, in which the pawl is arranged to be brought into engagement with the ratchet wheel from below, the ratchet wheel teeth are undercut, and due to the undercutting of the teeth the pawl when brought into engagement therewith is supportingly held by the teeth in engagement therewith until the pawl reaches a prescribed position on its driving movement stroke.

12. A device as claimed in claim 11, in which the ratchet wheel and the shaft rotate in opposite senses, rotation of the ratchet wheel being effected over the upper arcuate region of the shaft.

13. A device as claimed in claim 1, in which said roller means has a flock surface and is guided in its movement in the direction beyond the bottom opening of the supply reservoir by guide means defining a surface curved in conformity to a substantial peripheral portion of the roller means.

* * * * *